United States Patent
Kumar et al.

(10) Patent No.: US 10,475,036 B2
(45) Date of Patent: Nov. 12, 2019

(54) RESTRICTING ACCOUNT USE BY CONTROLLED REPLENISHMENT

(71) Applicant: CA, Inc., New York, NY (US)

(72) Inventors: Sharath Lakshman Kumar, Bangalore (IN); Mahesh Malatesh Chitragar, Bangalore (IN); Mohammed Mujeeb Kaladgi, Bangalore (IN); Pradeep G. Nair, Bangalore (IN)

(73) Assignee: CA, Inc., New York, NY (US)

( * ) Notice: Subject to any disclaimer, the term of this patent is extended or adjusted under 35 U.S.C. 154(b) by 552 days.

(21) Appl. No.: 14/991,511

(22) Filed: Jan. 8, 2016

(65) Prior Publication Data

US 2017/0200160 A1 Jul. 13, 2017

(51) Int. Cl.
*G06Q 20/40* (2012.01)
*H04L 29/06* (2006.01)
*G06Q 20/38* (2012.01)
*G06Q 20/22* (2012.01)
*G06Q 20/34* (2012.01)

(52) U.S. Cl.
CPC ......... *G06Q 20/405* (2013.01); *G06Q 20/227* (2013.01); *G06Q 20/35785* (2013.01); *G06Q 20/3829* (2013.01); *H04L 63/083* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 6,484,182 B1 * | 11/2002 | Dunphy | ................. | G06Q 10/06 707/999.102 |
| 6,961,858 B2 * | 11/2005 | Fransdonk | .............. | G06F 21/10 380/281 |
| 6,970,851 B1 * | 11/2005 | Goodwin, III | ..... | G06Q 20/3552 380/200 |

(Continued)

OTHER PUBLICATIONS

Copeland et al (Wallet-on-Wheels—Using Vehicle's Identity for Secure Mobile Money) (Year: 2013).*

*Primary Examiner* — Mamon Obeid
(74) *Attorney, Agent, or Firm* — Meyertons, Hood, Kivlin, Kowert & Goetzel, P.C.

(57) ABSTRACT

A restriction request message, including a restriction parameter for a secondary account, is received from a device that is associated with a primary account, via a network node that is outside of a secure authorization network. A replenishment request message, including a password and an account replenishment parameter for the secondary account, is also received via a network node that is outside of the authorization network. Authentication is performed based on the password, and the restriction parameter for the secondary account is identified responsive to receiving the replenishment request message. Responsive to determining that the account replenishment parameter satisfies the restriction parameter, a replacement key is generated and associated with the account replenishment parameter for the secondary account. A replenishment response message including the replacement key is transmitted to a device that is associated with the secondary account, via a network node that is outside of the authorization network.

23 Claims, 8 Drawing Sheets

(56) References Cited

U.S. PATENT DOCUMENTS

| Patent/Pub. No. | Date | Inventor | Classification |
|---|---|---|---|
| 7,020,635 B2 * | 3/2006 | Hamilton | G06Q 20/00 705/51 |
| 7,080,049 B2 * | 7/2006 | Truitt | G06Q 20/16 380/30 |
| 7,090,128 B2 * | 8/2006 | Farley | H04L 67/2823 235/384 |
| 7,107,462 B2 * | 9/2006 | Fransdonk | G06Q 20/12 380/282 |
| 7,150,045 B2 * | 12/2006 | Koelle | G06F 21/552 726/26 |
| 7,587,502 B2 * | 9/2009 | Crawford | A63F 13/12 709/229 |
| 7,668,750 B2 * | 2/2010 | Bonalle | G06Q 20/00 235/380 |
| 7,705,732 B2 * | 4/2010 | Bishop | G06Q 20/04 340/5.4 |
| 7,711,586 B2 * | 5/2010 | Aggarwal | G06Q 10/02 705/5 |
| 9,614,857 B2 * | 4/2017 | Nayshtut | G06F 21/554 |
| 9,953,479 B1 * | 4/2018 | Sawant | H04W 12/02 |
| 2003/0119478 A1 * | 6/2003 | Nagy | G06Q 20/04 455/408 |
| 2003/0177028 A1 * | 9/2003 | Cooper | G06Q 20/108 705/42 |
| 2003/0200184 A1 * | 10/2003 | Dominguez | G06Q 20/02 705/78 |
| 2004/0088250 A1 * | 5/2004 | Bartter | G06Q 20/04 705/39 |
| 2004/0128166 A1 * | 7/2004 | Yamamoto | G06F 19/328 705/2 |
| 2004/0247016 A1 * | 12/2004 | Faries, Jr. | A61J 1/1487 374/162 |
| 2006/0004865 A1 * | 1/2006 | Theurer | G06F 11/3419 |
| 2006/0156385 A1 * | 7/2006 | Chiviendacz | G06F 21/36 726/2 |
| 2006/0291533 A1 * | 12/2006 | Faries, Jr. | A61J 1/1462 374/162 |
| 2007/0088624 A1 * | 4/2007 | Vaughn | G06Q 30/02 705/15 |
| 2007/0106611 A1 * | 5/2007 | Larsen | G06Q 20/10 705/44 |
| 2007/0196806 A1 * | 8/2007 | Ljungman | G09B 3/00 434/350 |
| 2011/0276495 A1 * | 11/2011 | Varadarajan | G06F 21/31 705/71 |
| 2012/0330837 A1 * | 12/2012 | Persaud | G06Q 20/20 705/44 |
| 2013/0165071 A1 * | 6/2013 | Jonasson | H04L 12/1457 455/406 |
| 2013/0185209 A1 * | 7/2013 | Ahn | G06Q 20/3827 705/44 |
| 2015/0178724 A1 * | 6/2015 | Ngo | H04L 9/0869 705/71 |
| 2015/0180836 A1 * | 6/2015 | Wong | H04L 9/0869 713/172 |
| 2015/0220914 A1 * | 8/2015 | Purves | G06Q 20/36 705/26.8 |
| 2015/0339664 A1 * | 11/2015 | Wong | H04L 9/3234 705/71 |
| 2016/0065370 A1 * | 3/2016 | Le Saint | H04L 9/0841 713/155 |
| 2016/0092696 A1 * | 3/2016 | Guglani | G06F 21/335 |
| 2016/0092871 A1 * | 3/2016 | Gordon | H04L 63/0414 705/44 |
| 2016/0092872 A1 * | 3/2016 | Prakash | G06Q 20/3829 705/65 |
| 2016/0127379 A1 * | 5/2016 | Nayshtut | G06F 21/554 726/1 |
| 2016/0140545 A1 * | 5/2016 | Flurscheim | G06Q 20/3821 705/76 |
| 2016/0358163 A1 * | 12/2016 | Kumar | G06Q 20/3823 |
| 2017/0178137 A1 * | 6/2017 | Pachouri | H04L 63/0838 |
| 2017/0200160 A1 * | 7/2017 | Kumar | G06Q 20/405 |
| 2017/0270545 A1 * | 9/2017 | Montgomery, III | G06Q 30/0202 |
| 2017/0324743 A1 * | 11/2017 | Nayshtut | G06F 21/554 |
| 2018/0026973 A1 * | 1/2018 | Le Saint | G06Q 20/18 713/168 |
| 2018/0033003 A1 * | 2/2018 | Koganti | G06Q 20/322 |
| 2018/0276655 A1 * | 9/2018 | Sawant | G06Q 20/367 |

* cited by examiner

RESTRICTING ACCOUNT USE BY CONTROLLED REPLENISHMENT

FIELD

The present invention relates generally to electrical computers and digital processing systems, and more particularly, to interprogram communication for authentication and authorization.

BACKGROUND

As user accounts are increasingly used in computer-based transactions, methods of controlling and managing such user accounts may become increasingly important. This may be of particular relevance when an account of one individual or entity is linked with an account of another individual or entity. For example, an employee or a dependent (e.g. child, student, etc.) may have a secondary account that is linked to a primary account of an employer or parent, respectively.

When accounts are so linked, the primary account holder (e.g. employer, parent, etc.) may wish to establish certain restrictions on the use of the linked account, particularly to the extent that the primary account holder is responsible for activity that is conducted using the secondary account. However, some existing methods of restricting usage of a linked account may be lacking with respect to security and/or convenience for the primary account holder.

SUMMARY

Some embodiments described herein are directed to a computer server that is communicatively coupled to one of a plurality of nodes of a secure payments network. The computer server includes a network interface, a processor coupled to the network interface, and a memory coupled to the processor. The memory includes a computer-readable storage medium storing computer-readable program code therein. When executed, the computer-readable program code causes the following operations to be performed by the processor of the computer server. A restriction request message, which includes a restriction parameter for a secondary account, is received through the network interface from a device that is associated with a primary account, via a network node that is outside of a payments network. A replenishment request message, which includes a password and an account replenishment parameter for the secondary account, is also received through the network interface via a network node that is outside of the payments network. Authentication is performed based on the password included in the replenishment request message, and the restriction parameter for the secondary account is identified responsive to receiving the replenishment request message. Responsive to determining that the account replenishment parameter satisfies the restriction parameter, a replacement key is generated. The replacement key is associated with the account replenishment parameter for the secondary account. A replenishment response message including the replacement key is transmitted through the network interface to a device that is associated with the secondary account, via a network node that is outside of the payments network.

Some embodiments described herein are directed to a method, in which operations as follow are performed by a processor of a computer server that is communicatively coupled to one of a plurality of payment nodes of a secure payments network. In the method, a restriction request message that includes a transaction restriction parameter for a secondary account is received from a consumer device that is associated with a primary account via a network node that is outside of the secure payments network. A replenishment request message, including a password and an account replenishment parameter for the secondary account, is received via a network node that is outside of the secure payments network. Authentication is performed based on the password included in the replenishment request message, and the transaction restriction parameter for the secondary account is identified responsive to receiving the replenishment request message. A replacement key that is associated with the account replenishment parameter for the secondary account is generated responsive to determining that the account replenishment parameter satisfies the transaction restriction parameter. A replenishment response message that includes the replacement key is transmitted to a consumer device that is associated with the secondary account via a network node that is outside of the secure payments network.

Some embodiments described herein are directed to a computer program product including a computer-readable storage medium having computer-readable program code embodied therein. When executed, the computer-readable program code causes the following operations to be performed by a processor of a computer server that is communicatively coupled to one of a plurality of payment nodes of a secure payments network. A restriction request message, which includes a transaction restriction parameter for a secondary account, is received from a consumer device that is associated with a primary account via a network node that is outside of the payments network. A replenishment request message, including a password and an account replenishment parameter for the secondary account, is received via a network node that is outside of the secure payments network. Authentication is performed based on the password included in the replenishment request message, and the transaction restriction parameter for the secondary account is identified responsive to receiving the replenishment request message. A replacement key that is associated with the account replenishment parameter for the secondary account is generated responsive to determining that the account replenishment parameter satisfies the transaction restriction parameter. A replenishment response message, which includes the replacement key, is transmitted to a consumer device that is associated with the secondary account via a network node that is outside of the secure payments network.

Other methods, computer servers, network nodes, and computer program products according to embodiments will be or become apparent to one with skill in the art upon review of the following drawings and detailed description. It is intended that all such additional methods, computer servers, network nodes, and computer program products, including any and all combinations of operations performed thereby, be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1A:
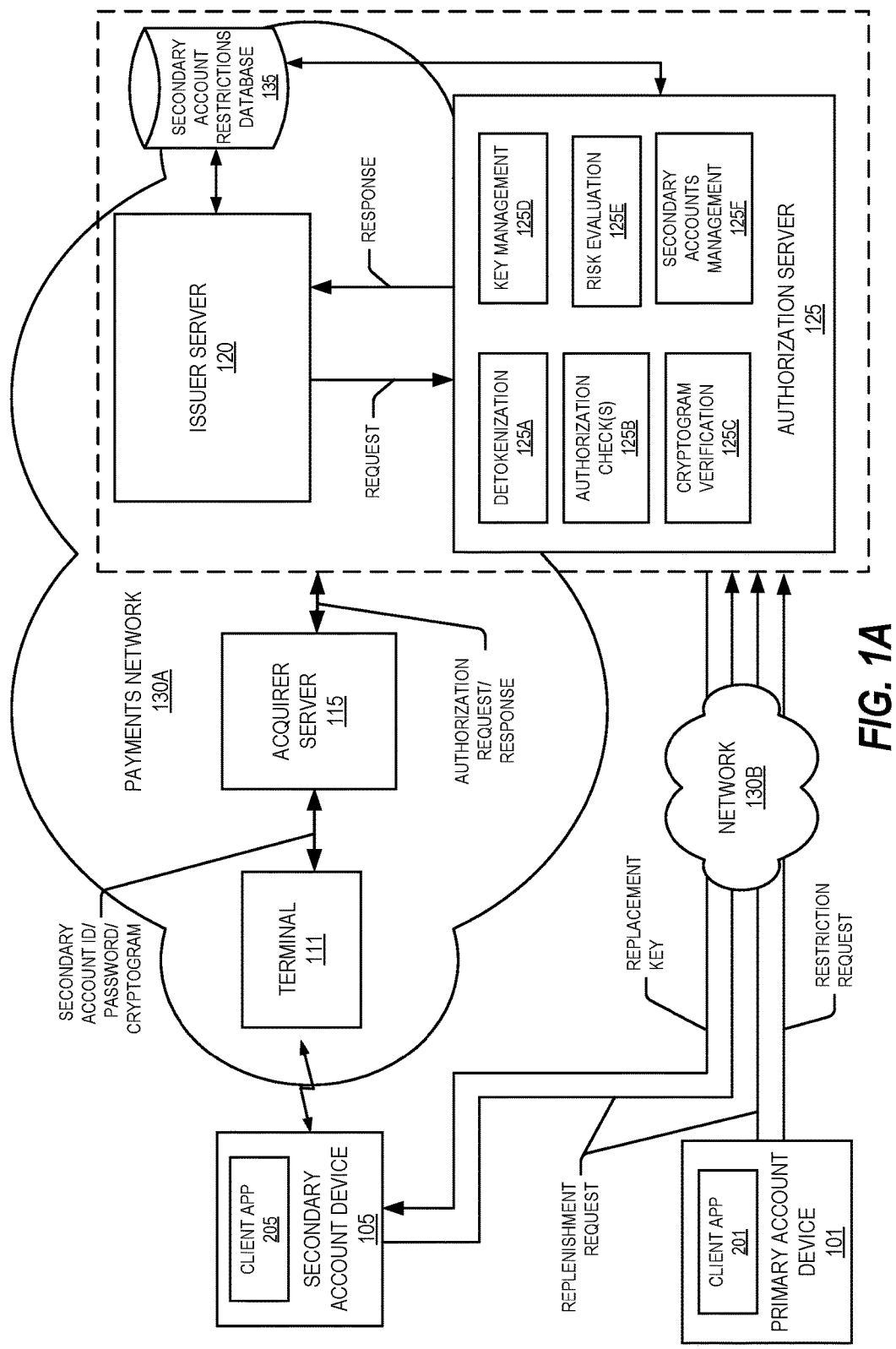
FIG. 1A is a block diagram illustrating components of a computer system in accordance with some embodiments.

Various embodiments will be described more fully hereinafter with reference to the accompanying drawings. Other embodiments may take many different forms and should not be construed as limited to the embodiments set forth herein. Like numbers refer to like elements throughout.

As described herein, a computer server may include a computer or cluster of computers. For example, the computer server can be a large mainframe, a minicomputer cluster, or a group of servers functioning as a unit. In one example, the computer server may be coupled to a Web server. The computer server may be coupled to a database and may include hardware (including one or more processors, memory, etc.), software, or combinations thereof for servicing the requests from one or more client computers. The computer server may include one or more computational apparatuses and may use any of a variety of computing structures, arrangements, and compilations for servicing the requests from one or more client computers.

An issuer may refer to a business entity (e.g., a bank) that maintains an account (e.g., a monetary account, such as a bank account, payment account, etc.) for a consumer (also referred to herein as an account holder). The account may be associated with a portable payments device. A portable payments device may refer to a mobile communication device, such as a smartphone, tablet computer, or other consumer electronic device including a mobile payments application installed thereon, or may refer to a credit card, debit card, smart card, or other portable card. An issuer may also store and/or define account parameters associated with the account for use by the payments device. An issuer may be associated with an issuer computer server that performs some or all of the functions of the issuer, and/or an authorization computer server that performs at least some functions on behalf of the issuer.

A merchant may refer to an entity that engages in electronic transactions for goods or services. A merchant terminal may refer to a computer include a point-of-sale (POS) terminal, a point-of-banking (POB) terminal, an automated teller machine (ATM) terminal, and/or other terminal that is associated with the merchant and is operable to conduct a monetary transaction with a user/consumer account.

An acquirer may refer to a business entity (e.g., a commercial bank) that has a business relationship with a merchant or other entity. An acquirer may be associated with an acquirer computer server that performs some or all of the functions of the acquirer. In some embodiments, an acquirer may include one or more entities that can perform some issuer and acquirer functions.

Some embodiments described herein provide methods, devices, and systems for network-based electronic transactions that can be performed by a payments device with or without a hardware-based secure element. For example, EMV cards (which are smart cards which store data on integrated circuits rather than magnetic stripes) may be used for contactless payment when a physical card is present; however, some embodiments described herein can utilize card emulation technology (e.g., Host Card Emulation (HCE), etc.) to emulate a smartcard on a mobile communication device (e.g., a portable payments device) to allow a client application running on the payments device to conduct contactless transactions, where the EMV application can be stored on a cloud-based Secure Element (SE). In particular, a client application can access a contactless interface (e.g., a near-field communication (NFC) transceiver) of the payments device via the operating system (OS) of the payments device without involving a hardware-based secure element. For example, when a user presents a cloud-based card for transaction, NFC commands may be routed to an HCE client app for verification and authorization processing though a mobile application management platform (MAP) based on the client app's Application Identifier (AID). The MAP in turn may connect to the issuer backend and payment system as needed to complete the transaction. The system may also include a cloud server managing the issuance of card data and cloud account lifecycle and a cloud transaction processor. A trusted tokenization system may be a shared resource that can be used to generate and de-tokenize tokens representing actual card data in the issuer backend. However, other embodiments described herein can be utilized with a contact-based or contactless smart card or fob that includes a hardware-based secure element therein. Still other embodiments described herein can be utilized with a credit/debit card that does not include a secure element therein, for example, a magnetic stripe-based card.

Embodiments described herein may arise from realization that a primary account holder of an account issued by an issuer (referred to herein as a primary account) may wish to provide a secondary account to another person or party (for example, an employee or dependent), while retaining some element of control over use of the secondary account. Accordingly, embodiments of the present invention enable a primary account holder to restrict transactions with a secondary account by selective replenishment of account parameters for the secondary account, which can be defined by and triggered by the primary account holder via a network node that is outside of a secure payments network.

For example, embodiments of the present invention may provide a web portal-based or client app-based card management console executing on a consumer device that is outside of (e.g., not authorized for access or communication with) the secure payments network. The card management console may allow for definition or selection of restrictions (for example, based on monetary amount, merchant(s), mode of payment, and/or number of transactions) for one or more secondary accounts, which, once met or exceeded, will prevent further transactions with the secondary account(s) unless replenishment is performed. The card management console may also allow the primary account holder to control selective replenishment of the account parameters within the specified restrictions, for example by definition or selection of account replenishment parameters, for example, replenishment for up to a specific monetary amount, for specific merchant(s), specific mode(s) of payment, and/or specific number of transactions). In some embodiments, the secondary account(s) may be sub-account(s) of the primary account. Also, a third-party server may perform operations for distinguishing between the primary and secondary account(s) such that the usage and/or existence of the secondary account(s) may be transparent to the issuer.

Thus, embodiments described herein may allow restricted use of one or more secondary accounts by multiple secondary account holders, under the control of the primary account holder, without involving multiple network entities. Embodiments described herein can be used in a mobile device that supports payment by means of NFC, BLE, QR code, and/or other methods of payment. Moreover, embodiments described herein may be used in open-loop payment systems, while still providing restrictions on account use that are typically associated with closed-loop payment systems. Embodiments described herein may be used to implement a cloud-based payments platform that provides a cloud-based transaction service.

FIG. 1A is a block diagram illustrating components of a computer system or environment 100 in accordance with some embodiments. Referring now to FIG. 1A, the computer system 100 includes a merchant terminal 111, an acquirer server 115 (which may be associated with the merchant's bank), an issuer server 120 (which may be associated with the account holder's bank), an authorization server 125, and an secondary account restrictions database 135, all of which are communicatively coupled to payment nodes that define a secure payments network (referred to herein as payments network/nodes 130A). The authorization server 125 may be configured to perform various functions for the issuer server 120, including but not limited to detokenization 125A, authorization check(s) 125B, cryptogram verification 125C, key management 125D, risk evaluation 125E, and secondary accounts management 125F. In some embodiments, the authorization server 125 may be a third-party server that is communicatively coupled to the issuer server 120 and is configured to perform various functions on behalf of the issuer server 120.

At least one of the issuer server 120 and the authorization server 125 is communicatively coupled, via one or more network nodes 130B that are outside of the secure payments network 130A, to a consumer device that is associated with a primary account created by the issuer server 120, also referred to herein as a primary account device 101. The primary account device 101 may be any wired or wireless consumer electronic device that is configured to transmit and receive data or communications to and from the servers 120 and/or 125 outside of the secure payments network 130A. For example, the primary account device 101 may be configured to store and execute a client application 201 for communication with the issuer server 120 and/or authorization server 125 for selection of transaction restriction parameters, where the client application 201 is linked or otherwise associated with the primary account. The primary account device 101 may include one or more network transceivers configured for communication with the server(s) 120/125 via the network/nodes 130B outside of the secure payments network/nodes 130A. The primary account may have one or more secondary accounts associated therewith, which may be created or defined by the issuer server 120 and/or the authorization server 125.

Still referring to FIG. 1A, each of the secondary accounts may be associated with a respective secondary account device 105 (such as a credit card or a mobile communications device executing a payment application). The secondary, account device 105 may likewise include one or more network transceivers configured for communication with the server(s) 120/125 via the network/nodes 130B outside of the secure payments network/nodes 130A. The secondary account device 105 may be configured to store and execute client payment application 205, such as a Host Card Emulation (HCE) app, for communication with the issuer server 120 and/or authorization server 125 for use in electronic transactions, where the client app 205 is linked or otherwise associated with one of the secondary accounts. For example, the secondary account device 105 may include one or more network transceivers configured for communication with a merchant terminal 111, and the client app 205 may allow the user of the secondary account device 105 to conduct offline purchases and mobile wallet transactions with the merchant terminal 111.

In particular embodiments, the secondary account device 105 may store a cryptographic key (discussed herein with reference to a limited-use key (LUK) by way of example), within a local data store. The LUK may be generated by the issuer server 120 and/or authorization server 125, and may be transmitted to the secondary account device 105 upon registering the client app 205 with the issuer server 120. The LUK may be associated with one or more account parameters for the secondary account, as well as an expiration date (for example, in the form of a timestamp that is added to the restrictions indicating the time of generation of the LUK). When the secondary account device 105 is used to conduct an electronic transaction with the merchant 111, the client app 205 retrieves the LUK from the local storage and uses the LUK as a form of identity. The server 120/125 may thus confidentially communicate transaction data with the client app 205 in a way that ties the transaction data to the secondary account, in some embodiments absent any association with one or more hardware-based components of the second account device 105.

The one or more account parameters associated with the secondary account may be updated or changed when the LUK is replenished, such that a new or replacement LUK, which is specified to replace a pre-existing LUK stored in the secondary account device 105, may be associated with one or more different account usage limits than the pre-existing LUK. The replacement LUK may be generated and transmitted to the secondary account device 105 independent of exhaustion of the pre-existing LUK stored therein in some embodiments. For example, the replacement LUK may be associated with account parameter(s) providing higher usage limit(s) for the account if the user has a recent pattern of conducting many high value transactions, or when it is during the holiday season when transaction activity is expected to increase. As another example, a replacement LUK may be associated with account parameter(s) providing lower usage limit(s) if the location of the portable communication device indicates that the user may have traveled to a high risk country where fraud is prevalent. The replacement LUK may be received from the server 120/125 responsive to a replenishment request from the primary account device 101 or the secondary account device 105. That is, replenishment of the LUK may be initiated by an electronic device outside of the secure payments network 130A. To ensure that a LUK cannot be 'replayed' for additional uses once its specified restrictions have been exhausted, the server 120/125 may maintain and reference a database of exhausted keys prior to authorizing a transaction.

It will be appreciated that, in various embodiments described herein, the primary account device 101 may be a mobile phone (e.g., smart phone, cellular phone, etc.), tablet, portable media player, laptop computer, desktop computer, personal digital assistant (PDA), and/or wearable computing device (e.g., watch), or other consumer electronic device. The secondary account device 105 may be any device that can be transported and operated by a user to conduct a transaction with the merchant terminal 111, for example, a mobile phone, tablet, portable media player, laptop computer, personal digital assistant (PDA), wearable computing device, other consumer electronic device that is configured to execute a payments application associated with the secondary account, or a pocket-sized or other portable card (e.g., contact-based or contactless smart credit/debit card) or fob that is associated with the secondary account, and is also referred to herein as a portable payments device.

It will likewise be appreciated that, in various embodiments described herein, the issuer server 120 and authorization server 125 may be implemented as a single server, separate servers, or a network of servers (physical and/or virtual), which may be co-located in a server farm or located in different geographic regions. Various elements of the network/nodes 130B may be part of a local, wide area, or global network, such as the Internet or other publicly accessible network, which are not authorized to access (e.g., outside of) the secure payments network 130A. Various elements of the secure payments network/nodes 130A may be interconnected by a secure wide area network (WAN), local area network (LAN), Intranet, and/or other private network, which may not be accessible by the nodes of the network 130B. The networks 130A and 130B may include wireless and/or wireline networks. More generally, although FIG. 1A illustrates an example of a computing system or environment 100, it will be understood that embodiments described herein are not limited to such a specific configuration, but are intended to encompass any configuration capable of carrying out the operations described herein.

Figure 1B:
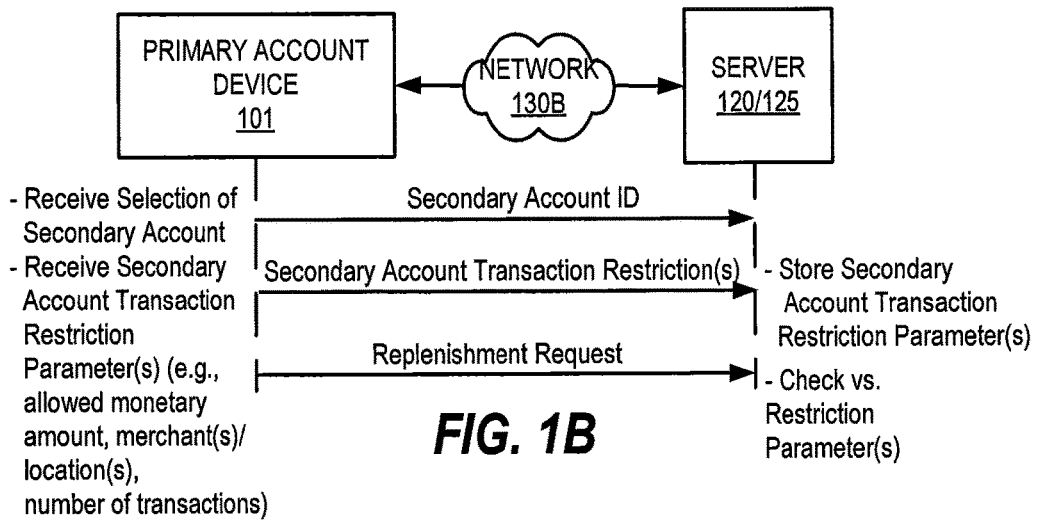
FIGS. 1B, 1C, and 1D are flow diagrams illustrating operations performed by various components of the computer system of FIG. 1A in accordance with some embodiments.

FIG. 1B is a flow diagram illustrating operations performed in requesting restriction(s) for transactions with secondary account by various components of the computer system 100 of FIG. 1A in accordance with some embodiments prior to an electronic transaction with a merchant. As shown in FIG. 1B, responsive to input from a user (e.g., the primary account holder) via its user interface, the primary account device 101 provides an identifier and password for the primary account to the issuer server 120 or the authorization server 125 (hereinafter referred to as the server 120/125) via the network/node 130B outside of the secure payments network 130A. The primary account device 101 also receives a user selection of a secondary account that is associated with the primary account, and one or more transaction restrictions for the secondary account, via its user interface. In some embodiments, the primary account holder-defined transaction restrictions can specify restrictions with respect to particular monetary amount(s), particular location(s), particular merchant(s), particular number of transactions (for example, based on an application transaction counter (ATC) to avoid replay attacks in contactless payment), duration/times of use, and/or other restrictions on the use of the secondary account.

In response to the selections, the primary account device 101 generates and transmits a request message containing an account identifier for the selected secondary account and the desired transaction restriction parameter(s) for the secondary account to the server 120/125 via the network/node 130B outside of the payments network 130A. The secondary account identifier and primary account holder-defined transaction parameter(s) may be transmitted in different request messages from the primary account device 101 in some embodiments. In response to receiving the request message(s) including the secondary account identifier and the transaction restriction parameter(s) for the secondary account via the network/node 130B outside of the secure payments network 130A, the server 120/125 stores the transaction restriction parameter(s) for the secondary account in a database, such as the secondary account restrictions database 135 of FIG. 1A. For example, the server 120/125 may create a data structure that logically associates the secondary account with the transaction restriction parameter(s) received from the primary account device 101. As further shown in FIG. 1B, the server 120/125 may subsequently receive a replenishment request message via the network/node 130B outside of the secure payments network 130A, and may determine whether the account parameter(s) to be replenished for the secondary account satisfy or otherwise fall within the corresponding transaction restriction parameter(s) stored in the database in order to generate a replacement key, as described in greater detail with reference to FIG. 1C.

Figure 1C:
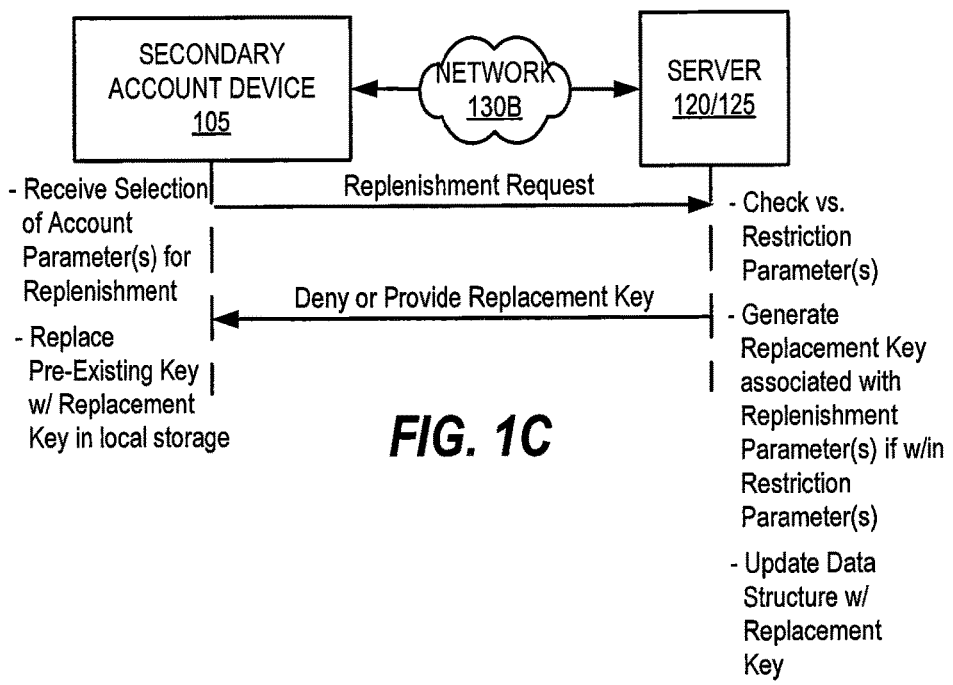

FIG. 1C is a flow diagram illustrating operations performed in requesting replenishment of one or more account parameters for transactions with secondary account by various components of the computer system 100 of FIG. 1A in accordance with some embodiments prior to an electronic transaction with a merchant. As shown in FIG. 1C, the server 120/125 receives a replenishment request message via the network/node 130B outside of the payments network 130A. The replenishment request message identifies the secondary account, and includes one or more secondary account parameters for which replenishment is desired by the requesting entity. The replenishment request message also includes a password provided by the requesting entity. The requesting entity that transmits the replenishment request message may be the secondary device 105 (as shown in the embodiment of FIG. 1C), the primary account device 101 (as shown in the embodiment of FIG. 1B), or other device that is associated with the primary and/or secondary accounts. As described herein, association with the primary and/or secondary accounts can be based on execution of a web portal and/or a client application that is configured to access the primary and/or secondary accounts.

Responsive to receiving the replenishment request message, the server 120/125 authenticates the requesting entity based on the password, and upon successful authentication, determines whether the account parameter(s) to be replenished (also referred to herein as account replenishment parameter(s)) are within or otherwise satisfy the corresponding transaction restriction parameter(s) for the secondary account stored in the database. If the account replenishment parameter(s) exceed or otherwise do not satisfy the corresponding transaction restriction parameter(s), the server 120/125 generates and transmits the replenishment response message denying the request to the requesting entity (e.g., the secondary account device 105 in the embodiment of FIG. 1C).

In contrast, if the account replenishment parameter(s) are within or otherwise satisfy the corresponding transaction restriction parameter(s), the server 120/125 generates a replacement key that is associated with the account replenishment parameter(s), and transmits a replenishment response message including the replacement key to the secondary account device 105. For example, the server 120/125 may generate the replacement key and update a data structure for the secondary account to logically associate the replacement key with the account replenishment parameter(s) (for instance, by replacing a pre-existing key in the data structure). Note that, upon generation of the replacement key, the replenishment response message including the replacement key is transmitted to the secondary account device 105 regardless of the requesting entity from which the replenishment request message is received. Upon receipt of the replenishment response message including the replacement key, the secondary account device 105 may replace a pre-existing key that is locally stored therein with the replacement key, independent of expiration of the pre-existing key and/or any parameter(s) associated therewith. The replacement key (and the replenished parameter(s) associated therewith) is thus used by the secondary account device 105 in future transactions, as described in greater detail with reference to FIG. 1D.

Figure 1D:
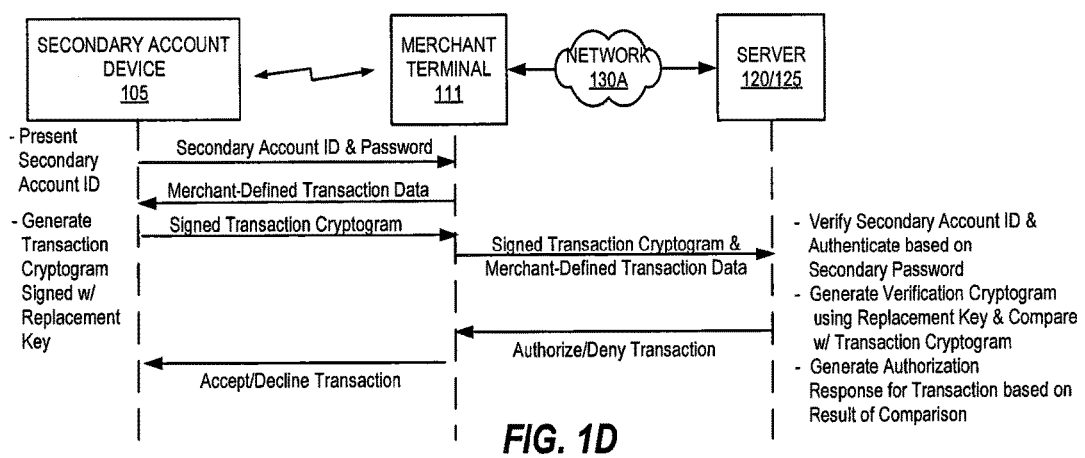

FIG. 1D is a flow diagram illustrating operations performed by the secondary account device 105 initiating and conducting an electronic transaction with the merchant terminal 111 by various components of the computer network of FIG. 1A in accordance with some embodiments. As shown in FIG. 1D, in initiating an electronic transaction, a secondary account holder provides, via the secondary account device 105, a secondary account identifier (for example, a secondary account card number) and a password associated with the secondary account to a merchant terminal 111. For instance, the secondary account device 105 may be a mobile device executing a client payments application (such as the client app 205 of FIG. 1A), which wirelessly transmits a message containing the secondary account identifier and password via its wireless interface to the merchant terminal 111. Alternatively, the secondary account device 105 may be a 'smart' or EMV-compliant credit/debit card including an integrated circuit chip therein, which provides the secondary account identifier and/or password to the merchant terminal 111 via a contact-based or contactless payment method (for example, by including the secondary account card number in a message transmitted via radio-frequency identification or near field communication).

In response to initiating the transaction, the secondary account device 105 receives transaction data, including a monetary amount for the transaction and/or other merchant defined transaction parameter(s), from the merchant terminal 111 via its wireless interface. Using the locally stored replacement key (received from the server 120/125 in FIG. 1C), the secondary account device 105 generates a transaction cryptogram that includes the merchant defined transaction parameter(s) and is signed with the replacement key. The transaction cryptogram may further include the secondary account identifier and/or other data or formatting that may be required by the issuer to approve the transaction. The secondary account device 105 thus transmits the signed transaction cryptogram to the merchant terminal 111.

In response to receiving the transaction cryptogram, the merchant terminal 111 generates a transaction authorization request message including the signed transaction cryptogram that includes the merchant defined transaction parameter(s), and transmits the authorization request message to the server 120/125 via the secure payments network/node 130A. In response to receiving the transaction authorization request message, the server 120/125 verifies the secondary account identifier, and performs authentication based on the password for the secondary account. Responsive to successful authentication, the server 120/125 accesses the stored data structure for the secondary account to retrieve the currently-associated replacement key, uses the replacement key to generate a verification cryptogram based on the merchant defined transaction parameter(s), and compares the verification cryptogram to the transaction cryptogram provided by the merchant terminal in the transaction authorization request message. The comparison is used to verify that the key that was used to sign the transaction cryptogram provided by the merchant terminal 111 corresponds to the replacement key that is currently associated with secondary account (and the account replenishment parameters associated therewith).

Still referring to FIG. 1D, the server 120/125 generates an authorization response message for an electronic transaction between the secondary account and the merchant terminal responsive to the comparison, and transmits the authorization response toward the merchant terminal 111 via the secure payments network/node 130A. In particular, if the comparison indicates a match, the server 120/125 determines whether the transaction parameter(s) provided by the merchant terminal exceed corresponding ones of the updated account replenishment parameter(s) associated with the replacement key; if not, the authorization response message indicates authorization for the electronic transaction. For example, the authorization response message may indicate authorization for up to a particular monetary amount that was replenished responsive to the replenishment request message received in the operations of FIG. 1B or 1C. The server 120/125 may also debit the secondary account for the current use (e.g., by subtracting the monetary amount and decrementing the transaction count) and may update the stored data structure accordingly. Alternatively, the authorization response message may indicate denial of the electronic transaction, for instance, where the merchant terminal 111 specifies a transaction amount that exceeds the replenished monetary amount that is currently associated with the secondary account.

The merchant terminal 111 thereby indicates acceptance or declination of the electronic transaction to the secondary account holder (for example, via the merchant terminal's 111 user interface or by transmitting a message to the secondary account device 105 for display thereby). As such, restrictions and selective replenishment of monetary amounts for electronic transactions with one or more secondary accounts can be controlled by the primary account holder. In some embodiments, secondary account replenishment and/or authentication for a transaction with the secondary account may only be possible responsive to receiving specification of the transaction restriction parameters for the secondary account from the primary account holder; otherwise the authentication may fail and the transaction may be declined.

Figure 2:
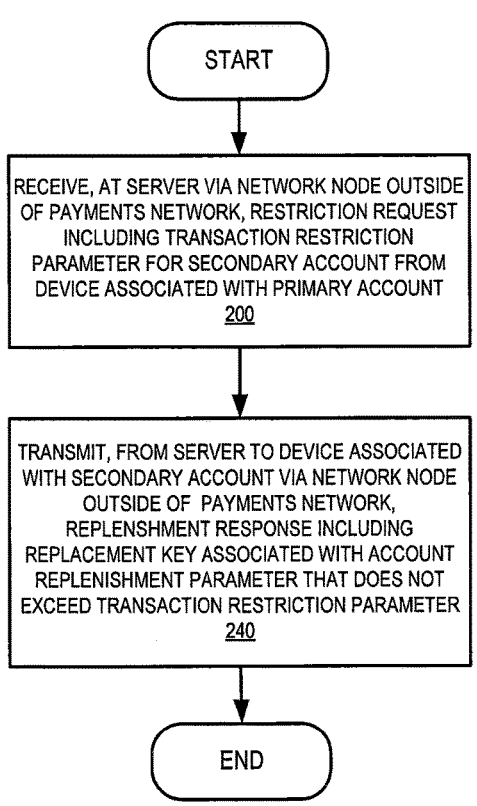
FIGS. 2-6 are flowcharts illustrating operations performed by various components of a computer system in accordance with some embodiments.

FIGS. 2-5 are flowcharts illustrating operations performed by various components of a computer system in accordance with some embodiments. For example, the operations of FIGS. 2, 3, 4A, 5, and 6 may be performed by a computer server communicatively coupled to a payment node of a secure payments network (for example, the authorization server 125 and/or the issuer server 120 of FIG. 1A), while the operations of FIG. 4B may be performed by a consumer device that is not communicatively coupled to one of the payment nodes of (i.e., outside of) a secure payments network (for example, the primary account device 101 of FIG. 1A). Referring to FIG. 2, at block 200, a restriction request message including at least one transaction restriction parameter for a secondary account is received at a computer server from a consumer device associated with the primary account. The transaction restriction parameter(s) may include, for example, particular monetary amount(s), geographic location(s), merchant(s), durations/times of use, and/or number of uses for the secondary account. The consumer device may be associated with the primary account by logging into a web portal and/or executing a client application that communicatively couples the consumer device to the computer server that maintains the primary account. The server is coupled to a payment node of a secure payments network, while the restriction request message is received from the consumer device via a network noted that is outside of (e.g., unauthorized for communication with) the payments network. As such, transaction restriction parameter(s) for electronic transactions with the secondary account via the payments network may be defined the primary account holder via a network node that is outside of the payments network.

In response to receiving a subsequent replenishment request message including one or more account replenishment parameters for the secondary account via a network node that is outside of the payments network, a replenishment response message is generated and transmitted from the server to a device associated with the secondary account via the network node outside of the payments network at block 240. The replenishment response message includes a replacement key that is associated with account replenishment parameter(s) for the secondary account, where the account replenishment parameter(s) do not exceed the corresponding (i.e., in type of parameter) transaction restriction parameter(s) specified at block 200. The primary account holder can thus control replenishment of account parameters for the secondary account, by initiating or otherwise controlling generation of a replacement limited use key subject to specified restrictions, regardless of whether any pre-existing account parameters for the secondary account (e.g., as associated with a pre-existing key) have been exhausted.

Figure 3:
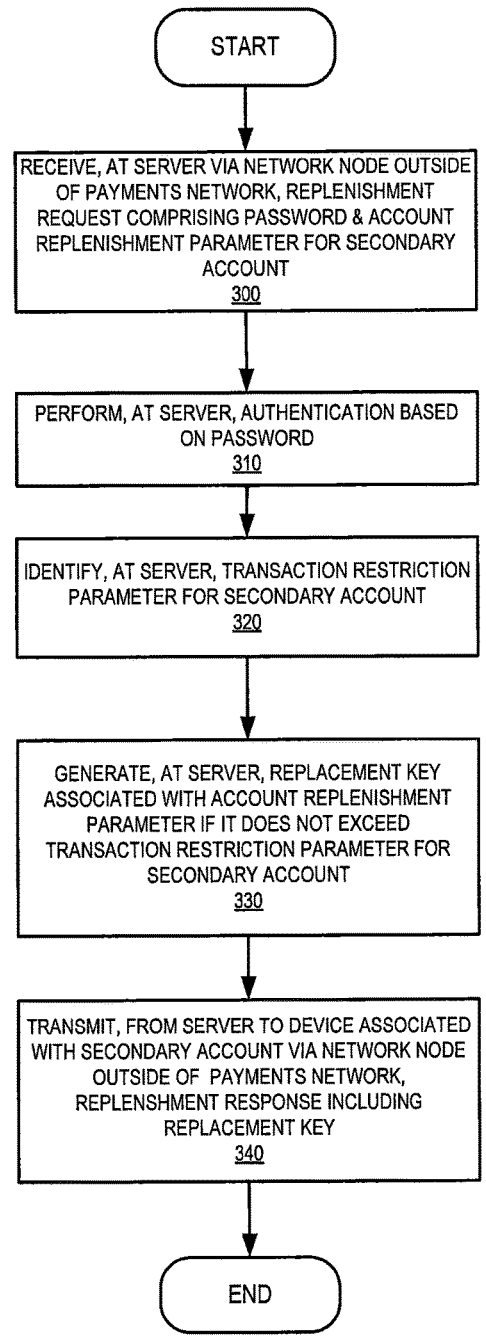

FIG. 3 is a flowchart illustrating further operations that may be performed by a computer server coupled to a payment node of the secure payments network, such as the authorization server 125 and/or the issuer server 120 of FIG. 1A, according to some embodiments. Referring now to FIG. 3, at block 300, a replenishment request message for a secondary account is received at a computer server via the network node that is outside of the payments network. The replenishment request message includes a password and one or more account replenishment parameters for the secondary account. The replenishment request message may be received from a consumer device, such as the device 101 associated with the primary account or the device 105 associated with the secondary account of FIG. 1A, via a web portal and/or a client application (or "app") executing thereon.

Authentication is performed at the server based on the password included in the replenishment request message at block 310. In embodiments where the replenishment request message is received from the primary account device or app 105, authentication may be performed based on the primary password associated with the primary account, while in embodiments where the replenishment request message is received from the secondary account device or payment app 105, authentication may be performed based on the secondary password associated with the secondary account. At block 320, one or more transaction restriction parameters for the secondary account are identified at the server responsive to successful authentication. For example, the transaction restriction parameters applicable to the secondary account may be identified by accessing a previously stored data structure that logically associates the transaction restriction parameter(s) with the secondary account in a database that is accessible to the server, such as the database 135 of FIG. 1A.

Responsive to identification of the transaction restriction parameter(s) for the secondary account, it is determined whether the account replenishment parameter(s) received in the replenishment request message at block 300 exceed the transaction restriction parameter(s) identified for the secondary account at block 320. If the account replenishment parameter(s) do not exceed the transaction restriction parameter(s) identified for the secondary account, a replacement key associated with the account replenishment parameter(s) is generated by the server at block 330. The replacement key is generated by the server at block 330 independent of exhaustion of any corresponding account parameter(s) associated with a pre-existing key for the secondary account. A replenishment response message including the replacement key is generated by the server and transmitted toward a device associated with the secondary account via a network node that is outside of the payments network at block 340. As such, one or more account parameters for the secondary account, for conducting electronic transactions over the payments network by a secondary account device associated therewith, can be selectively replenished by a user of a consumer device that is outside of the payments network, subject to restrictions set by the primary account holder.

Figures 4A, 4B:
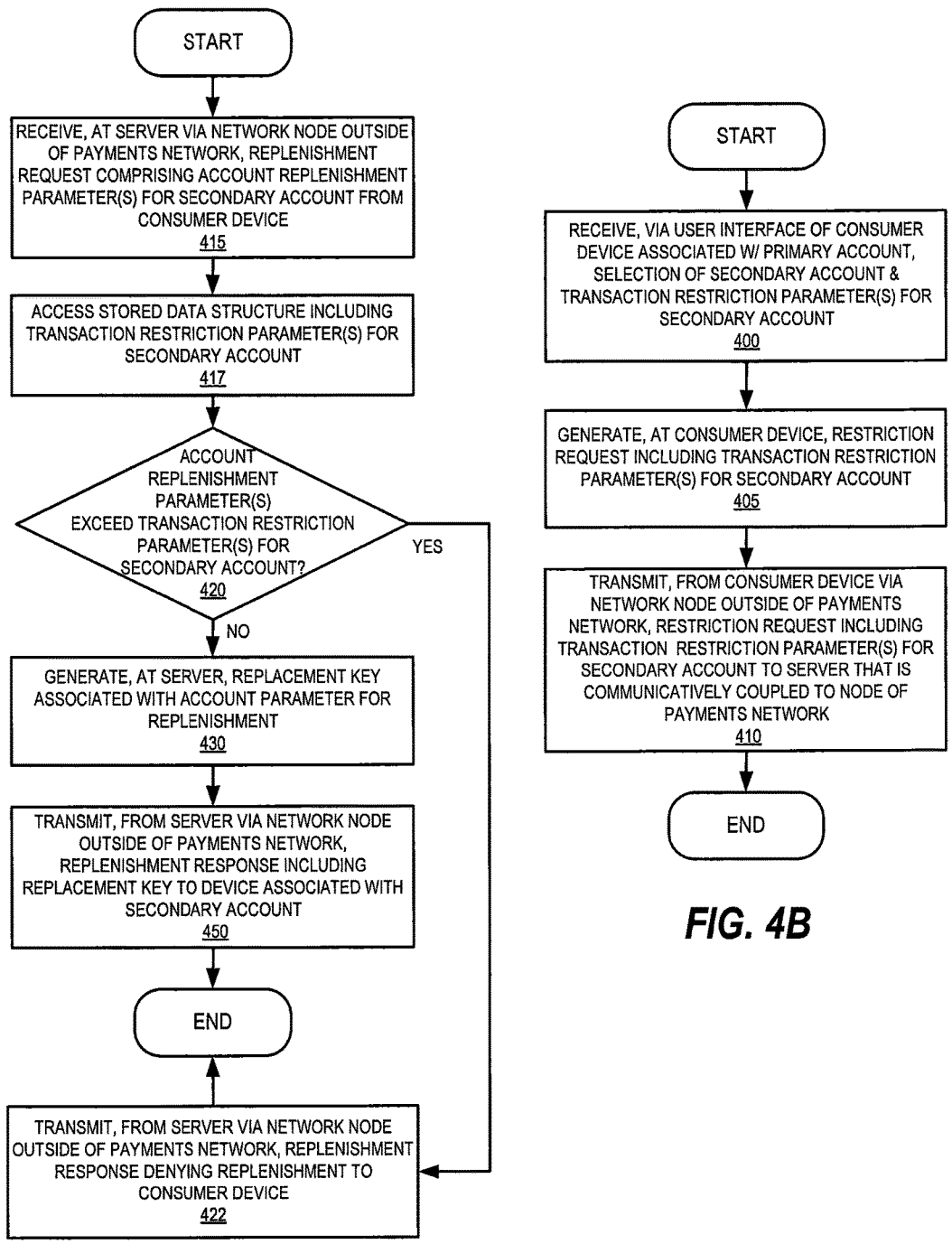

FIG. 4A is a flowchart illustrating operations for generation of a replacement key associated with an account replenishment parameter, which may be performed by a computer server coupled to a payments node of the payments network (for example, by the authorization server 125 and/or the issuer server 120 of FIG. 1A) according to some embodiments. Referring now to FIG. 4A at block 415, a replenishment request message including one or more account replenishment parameters for a secondary account is received at a computer server from a consumer device, via a network node that is outside of the payments network. The consumer device may be a wired or wireless communication terminal, which may be executing a web based or client application program for communication with an issuer of a primary account associated with the secondary account, either directly (via an issuer-based server) or indirectly (via a third-party authorization server).

In response to receiving the replenishment request message, a data structure including one or more transaction restriction parameters for the secondary account is accessed by the server at block 417. For example, the data structure may be stored in a database (such as the secondary account restrictions database 135 of FIG. 1A) that is accessible to the server, either via or outside of the payments network. At block 420, it is determined whether the account replenishment parameter(s) received in the replenishment request message at block 415 exceed the corresponding transaction restriction parameter(s) for the secondary account indicated by the stored data structure at block 417. If the account replenishment parameter(s) for the secondary account exceed the corresponding transaction restriction parameter(s), a replenishment response message denying the replenishment request is generated by the server and transmitted to the consumer device from which the replenishment request message was received via a network node outside of the payments network at block 422. For example, the server may transmit the replenishment response message denying the replenishment to a consumer device associated with the primary account (such as the primary account device 101) or to a consumer device associated with the secondary account (such as the secondary account device 105), depending on the origination of the replenishment request message.

However, if the account replenishment parameter(s) for the secondary account do not exceed the corresponding transaction restriction parameter(s), a replacement key is generated by the server at block 430. The replacement key is associated with the account parameter(s) for replenishment, and may be specified to replace a pre-existing key that is stored in a consumer device associated with the secondary account. The replacement key may be generated at block 430 in response to the replenishment request message received via a network node outside of the payments network, independent of exhaustion of one or more corresponding parameters associated with the pre-existing key for the secondary account in some embodiments. In some embodiments, the replenishment request message may specify one or more account replenishment parameters that are less than the corresponding parameters, effectively reducing the parameter(s) available to the secondary account.

At block 450, a replenishment response message including the replacement key is transmitted to a device associated with the secondary account (for example, the secondary account device 105 of FIG. 1A) via a network node outside of the payments network. The device associated with the secondary account may thus use the newly generated replacement key, associated with the replenished account parameter(s), for subsequent transactions with one or more merchant terminals that are coupled to respective nodes of the payments network. It will be understood that, although described above with reference to a single secondary account, the secondary account may be one of multiple secondary accounts that are associated with the primary account, each of which may be associated with respective transaction restriction parameters, for example, by respective data structures stored in a database that is accessible to the server. As such, respective replacement keys may be generated for each of such secondary accounts in accordance with the operations of FIG. 4A.

FIG. 4B is a flowchart illustrating operations that may be performed by a consumer device (such as the primary account device 101 of FIG. 1A) to associate one or more transaction restriction parameters with the secondary account according to some embodiments. Referring now to FIG. 4B, a selection of a secondary account and one or more transaction restriction parameters for the secondary account are received via a user interface of a consumer device that is associated with a primary account at block 400. In some embodiments, a user of the consumer device (for example, a primary account holder) may login to a web portal that is linked to the issuer of the primary account (using an identifier and password corresponding to the primary account), may select the secondary account by providing an account identification number or other account identifier corresponding to the secondary account, and may enter one or more desired transaction restriction parameters, to which transactions with the secondary account (e.g., initiated by the secondary account holder) are to be limited. In other embodiments, the user of the consumer device may download a client application (or "app") that is configured for communication with the issuer and is associated with the primary account, and may select the secondary account and the desired transaction restriction parameter(s) via the app. The transaction restriction parameters may include, but are not limited to, particular monetary amount(s), particular geographic location(s), particular merchant(s), particular number of uses, and/or particular durations/times of use.

In response to the input received via the user interface at block 400, a restriction request message including the transaction restriction parameter(s) for the secondary account is generated at the consumer device at block 405. At block 410, the restriction request message is transmitted from the consumer device to a computer server that is communicatively coupled to a payment node of the payments network, such as the server 120/125 of FIG. 1A. However, as the consumer device lacks access to the secure payments network, the restriction request message is transmitted to the server at block 410 via a network node that is outside of the payments network. As such, a primary account holder may provide limitations or restrictions for an electronic transaction that is initiated by a secondary account holder to be conducted via the payments network, using a consumer device that is not configured to access the payments network. A replenishment request message specifying account parameters to be replenished for the secondary account may be similarly provided by receiving a selection of the secondary account and one or more account replenishment parameters for the secondary account via a user interface of a consumer device (associated with either the primary account or the secondary account) at block 400, generating a replenishment request message including the account replenishment parameter(s) at block 410, and transmitting the replenishment request message to the server via a network node that is outside of the payments network at block 415.

Figure 5:
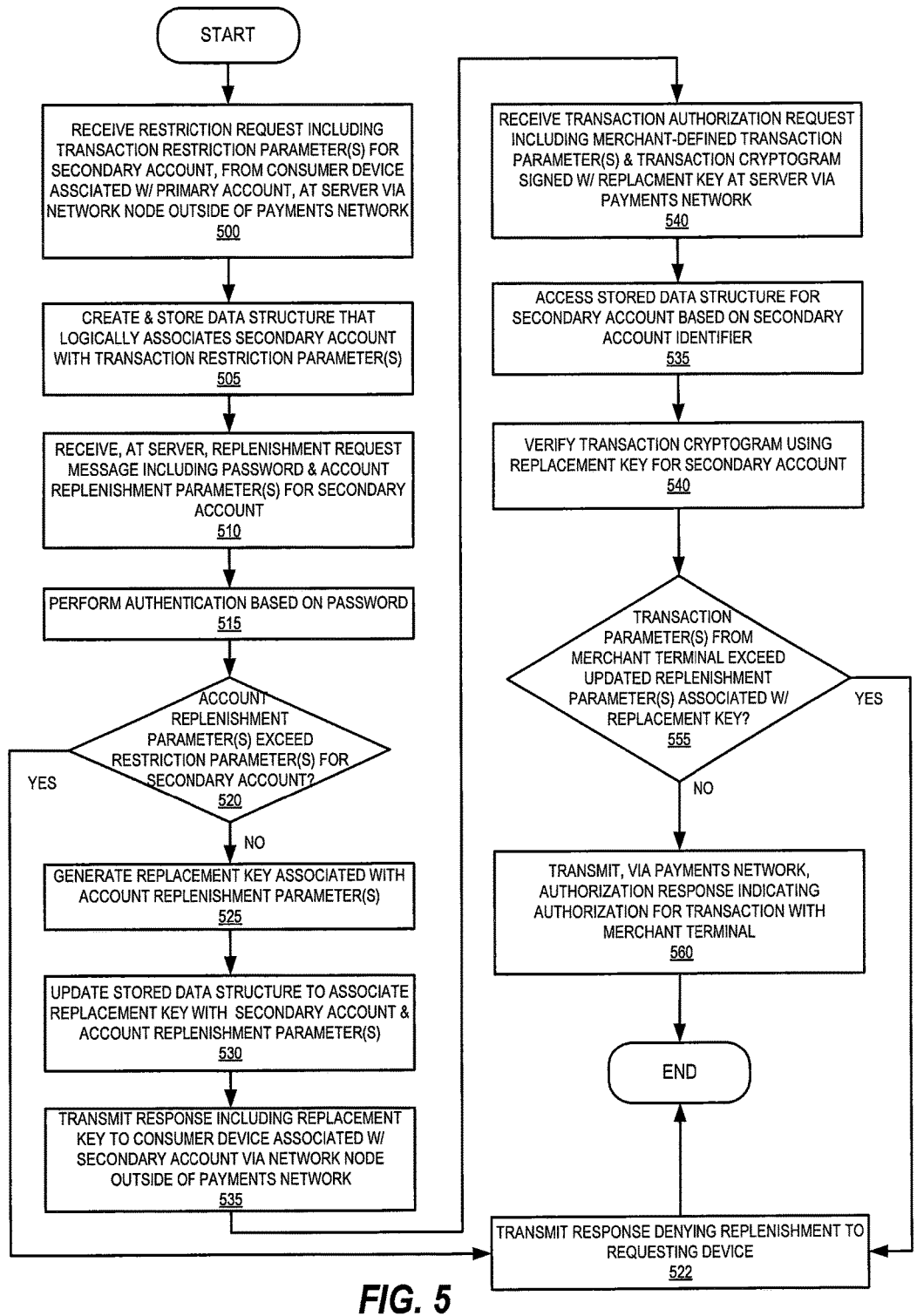

FIG. 5 is a flowchart illustrating operations that may be performed by a computer server (such as the authorization server 125 and/or the issuer server 120 of FIG. 1A) in authenticating and authorizing a transaction initiated by a secondary account holder responsive to replenishment of one or more account parameters for the secondary account in accordance with some embodiments described herein. Referring now to FIG. 5, a restriction request message including one or more transaction restriction parameters for the secondary account is received from the consumer device at block 500. The transaction restriction parameter(s) may include, but are not limited to, a restriction to a monetary amount or amounts, a restriction to particular merchant and or merchants, a restriction to particular geographic location or locations, a restriction with respect to a number of uses, and/or a restriction with respect to particular durations/times of use of the secondary account. The restriction request message may be transmitted from the consumer device responsive to input by a primary account holder. The restriction request message is received via a network node that is outside of (e.g., unauthorized for communication with) a secure payments network.

In response to authentication of the restriction request message at the server (for example, based on an identifier and password associated with the primary account received from the consumer device), a data structure that logically associates the included transaction restriction parameter(s) with the secondary account is created and stored in the database that is accessible to the server at block 505. Subsequently, a replenishment request message including a password and one or more account replenishment parameters for the secondary account is received at the server, via a network node that is outside of the payments network, at block 510, and authentication is performed based on the password at block 515. Authentication at block 515 may be performed based on the primary password associated with the primary account, or based on the secondary password associated with the secondary account, depending upon the association of the device from which the replenishment request message was received (e.g., whether the replenishment request was received from the primary account device 101 or the secondary account device 105 of FIG. 1A).

At block 520, it is determined whether the account replenishment parameter(s) included in the replenishment request message exceed the transaction restriction parameter(s) for the secondary account provided in the restriction request message. If so, a replenishment response message denying replenishment is transmitted to the requesting device (i.e., the device from which the replenishment request message was received) via a network node that is outside of the payments network at block 522. In some embodiments where the authorization server 125 and the issuer server 120 are separate entities, the authorization server 125 may generate and transmit the response message denying replenishment without involving the issuer server 120.

However, if it is determined at block 520 that the account replenishment parameter(s) included in the replenishment request message fall within or otherwise satisfy the transaction restriction parameter(s) for the secondary account provided in the restriction request message, a replacement limited-use key (LUK) associated with the account replenishment parameter(s) is generated at block 525. The replacement LUK is generated at block 525 to replace a pre-existing LUK that is stored in the consumer device associated with the secondary account, regardless of whether any corresponding parameter(s) associated with the pre-existing LUK have or have not been exhausted. The stored data structure, which was created at block 505, is updated to associate the replacement LUK with the secondary account and/or the account replenishment parameter(s) at block 530. A replenishment response message including the replacement LUK is transmitted to a consumer device associated with the secondary account (e.g., the secondary account device 105 of FIG. 1A) via a network node that is outside of the payments network at block 535.

Subsequent to the operations of blocks 500-535, a transaction authorization request message including one or more merchant defined transaction parameters and a transaction cryptogram that has been signed with the replacement key is received at the server via a network node of the secure payments network at block 540. For example, the merchant defined transaction parameter(s) in the transaction cryptogram may be included in the authorization request message responsive to receipt thereof (directly or indirectly) from a merchant terminal that is communicatively coupled to one of the payment nodes of the payment network. Based on a secondary account identifier included in the transaction cryptogram, the stored data structure for the secondary account is identified to retrieve the currently-associated replacement LUK at block 535, and the transaction cryptogram is verified using the replacement LUK for the secondary account at block 540 responsive to accessing the stored data structure. For example, the server may generate a verification cryptogram using the replacement LUK, and may compare the verification cryptogram to the transaction cryptogram provided by the merchant terminal in the transaction authorization request message to verify that the key that was used to sign the transaction cryptogram in the transaction with the merchant terminal corresponds to the replacement LUK that is currently associated with secondary account (and the account replenishment parameters associated therewith).

At block 555, it is determined whether the transaction parameter(s) provided by the merchant terminal and received in the transaction authorization request message exceed corresponding ones of the updated account replenishment parameter(s) associated with the replacement LUK. If so, a response message denying the transaction is generated and transmitted toward the requesting device (i.e., the merchant terminal) via the payments network at block 522. However, if the transaction parameter(s) received in the transaction authorization request message fall within the updated account replenishment parameter(s) (that is, if the updated account replenishment parameter(s) are sufficient to cover the transaction parameter(s)), an authorization response message indicating authorization for the transaction with the merchant terminal is generated and transmitted towards the merchant terminal via a node of the payments network at block 560. In some embodiments, the authorization request message may indicate authorization for the transaction between the merchant terminal and a primary account that is associated with the secondary account, for instance, upon recognition of the secondary account identifier as a token that was previously generated by the server to associate the secondary account as a sub-account of the primary account, as described in greater detail below with reference to FIG. 6. In other embodiments, the authorization response message may indicate authorization for the transaction between the merchant terminal and the secondary account itself.

While described above with reference to operations that may be generally performed by an issuer server 120 and/or an authorization server 125, in some embodiments described herein the authorization server 125 is configured to perform operations such that the existence and/or use of the secondary account(s) is transparent to the issuer. In particular, FIG. 6 is a flowchart illustrating operations that may be performed by a computer server (such as the authorization server 125 of FIG. 1A) that is coupled between the merchant and the issuer, in authenticating and authorizing a transaction initiated by a secondary account holder for secondary account (which is not directly managed by the issuer of the primary account) in accordance with some embodiments described herein.

Figure 6:
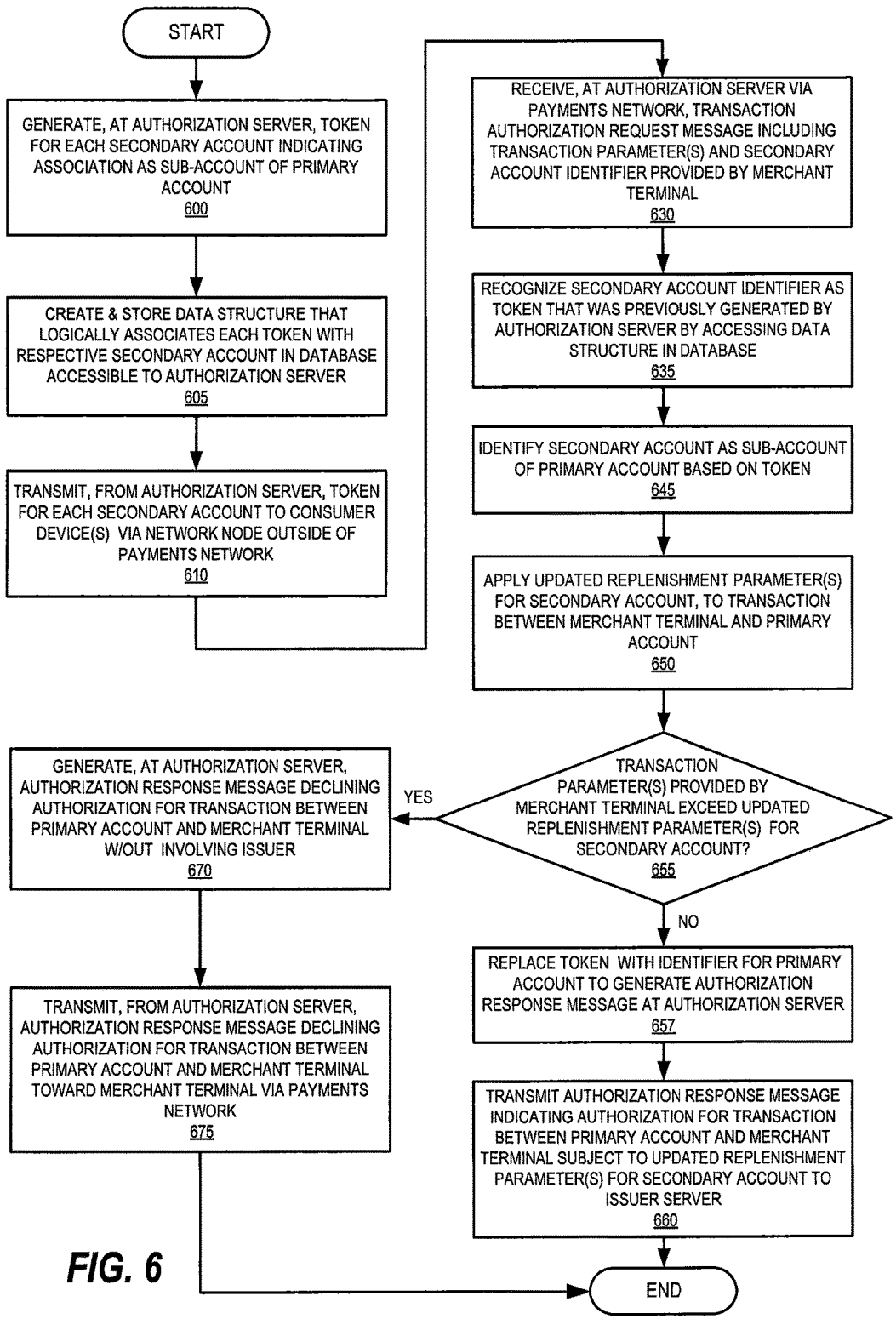

Referring now to FIG. 6, responsive to a request from a primary account holder to create one or more secondary accounts linked as one or more sub-accounts of a primary account, a token is generated for each secondary account by the authorization server at block 600. Each token may be a numerical or other identifier corresponding to one of the secondary accounts. At block 605, one or more data structures that logically associate each token with its respective secondary account are created and stored in a database that is accessible to the authorization server. For example, a data structure may be created for each primary account, listing one or more secondary accounts that are sub-accounts of the primary account, and listing the token or other identifier generated for each of the secondary accounts. For instance, in some embodiments, the authorization server may create and maintain a list of secondary credit/debit card numbers and corresponding tokens that are assigned to a same primary credit/debit card number. The token for each secondary account is transmitted from the authorization server to at least one consumer electronic device via a network node that is outside of the payments network at block 610. For example, a message including one of the tokens may be transmitted to a payments device that is associated with the corresponding secondary account, for use in subsequent transactions thereby.

Subsequent to the operations of blocks 600-610, a transaction authorization request message including a secondary account identifier and one or more transaction parameters provided by a merchant terminal is received at the authorization server via the payments network at block 630. The secondary account identifier and/or other data in the transaction authorization request message may include a resource locator identifying the authorization server, such that the transaction authorization request message is routed to the authorization server via the payments network. In some embodiments, the authorization request message may be transmitted to the authorization server by the issuer server, while in other embodiments, the authorization request message may be transmitted to the authorization server by one or more other network node(s) of the payments network, such that the authorization server may receive the transaction authorization request message prior to or independent of the issuer server.

Responsive to receiving the transaction authorization request message at the authorization server, the secondary account identifier included therein is identified or otherwise recognized as a token that was previously generated by the authorization server at block 635. In particular, the secondary account identifier may be recognized by accessing the data structure that was created and stored in the database at block 605. The secondary account is identified as a sub-account of the primary account responsive to recognition of the token at block 645, and one or more updated replenishment parameters for the secondary account (for example, as associated with a replacement limited use key currently used by the secondary account) is applied to the transaction between the merchant terminal and the primary account at block 650 responsive to identification of the secondary account as a sub-account of the primary account. For example, a data structure stored in a database that is accessible to the authentication server (such as the secondary account restrictions database 135 of FIG. 1A) may be accessed to determine the limited use key that is currently associated with the secondary account based on the secondary account identifier, verification may be performed using the limited use key (by using the limited use key to generate a verification cryptogram, and comparing the verification cryptogram to a transaction cryptogram included in the transaction authorization request message), and the replenishment parameter(s) for the secondary account may be applied to the transaction with the primary account responsive to successful verification.

Still referring to FIG. 6, at block 655, it is determined whether the transaction parameter(s) specified by the merchant terminal (as indicated in the transaction authorization request message at block 630) exceed the corresponding updated replenishment parameter(s) for the secondary account (as determined and applied at block 650). If so, an authorization response message declining authorization for the transaction between the primary account and the merchant terminal is generated by the authorization server at block 670. As management of the secondary account may be handled by the authorization server in a manner that is transparent to the issuer or associated server(s) in the embodiment of FIG. 6, the authorization server may generate the authorization response message declining authorization for the transaction at block 670 without involving the issuer server(s). That is, in some embodiments, transmission of the authorization response message to the issuer server(s) may be prevented responsive to determining, at block 655, that the monetary amount for the transaction (or other transaction parameter(s)) specified by the merchant terminal exceeds the monetary amount (or otherwise fails to satisfy the updated replenishment parameter(s)) for the secondary account. As such, at block 675, the authorization response message declining authorization for the transaction between the primary account and a merchant terminal is transmitted from the authorization server toward the merchant terminal via the payments network.

On the other hand, if it is determined at block 655 that the transaction parameter(s) specified by the merchant terminal fall within or otherwise satisfy the corresponding updated replenishment parameter(s) for the secondary account, an authorization response message indicating authorization for the transaction between the primary account and the merchant terminal is generated by the authorization server at block 657. In particular, in generating the authorization response message, the token in the transaction authorization request message, as recognized at block 635, is replaced with an identifier for the primary account. The identifier of the primary account may be identical to that issued by or otherwise known to the issuer of the primary account. As such, at block 660, the authorization response message indicating authorization for the transaction between the primary account and the merchant terminal is transmitted to the issuer server. That is, in some embodiments, the authorization response message may only be transmitted to or otherwise involve the issuer server responsive to determining, at block 655, that the transaction parameter(s) specified by the merchant terminal do not exceed the updated replenishment parameter(s) that are currently-associated with the secondary account.

Upon receipt of the authorization response message authorizing the transaction between the primary account and the merchant terminal, the issuer server may charge or debit the primary account for the monetary amount specified by the merchant terminal, and may transmit a response message indicative of the same toward the merchant terminal, either directly or via the authorization server. As such, the issuer server may approve the transaction between the primary account and the merchant terminal without knowledge that the secondary account was used to initiate the transaction. That is, the issuer server may approve the transaction between the primary account and the merchant terminal independent of (from the perspective of the issuer) whether the transaction was initiated by the primary account holder/device or the secondary account holder/device.

In the operations of FIG. 6, the issuer may thus be unaware of the use of the secondary account(s) (and/or the transaction restriction parameter(s) or replenishment parameter(s) associated therewith) in approving or declining transactions with the primary account. In some embodiments, the existence of the secondary account(s), the associated secondary account identifier(s), the associated transaction restriction parameter(s), and/or the associated replenishment parameter(s) may be unknown to the issuer. For example, the authorization server may create the secondary account(s) as sub-accounts of the primary account, generate the account identifier(s)/token(s) for the secondary account(s), associate the secondary account(s) with the received transaction restriction parameter(s), and replenish the secondary account(s) with the associated replenishment parameter(s) independent of the issuer. Alternatively, in some embodiments, the authorization server may handle management of the secondary account(s) on behalf of and responsive to approval by the issuer server, which may act as an intermediary in forwarding the transaction authorization request and response messages between the authorization server and the merchant terminal. In yet other embodiments, a single server may perform the operations discussed above with reference to the separate issuer and authorization servers.

Embodiments described herein may provide several advantages. For example, embodiments described herein may provide enhanced security in allowing a secondary account holder to use a primary account to conduct transactions with a merchant, as the amount that can be withdrawn from/charged to the primary account is limited to the restriction parameters and replenishment parameters for the secondary account, which are approved in advance the primary account holder. Also, by using a secondary password or PIN for authentication of the secondary account, the primary account can be charged/debited without communicating or otherwise sharing the primary password or PIN with the secondary account holder and/or merchant. In addition, embodiments described herein may allow use of the primary account by multiple secondary account holders, each limited to respective transaction restriction parameters and account replenishment parameters based on selective replacement of respective limited use keys. That is, a primary account holder can restrict the use of one or more secondary accounts linked thereto by controlling initiation of the process that replenishes the limited use key(s) for the secondary account(s). Moreover, embodiments described herein may offer the above benefits without inconvenience to the primary account holder, as the primary card and associated primary account can be used without restriction.

Figure 7:
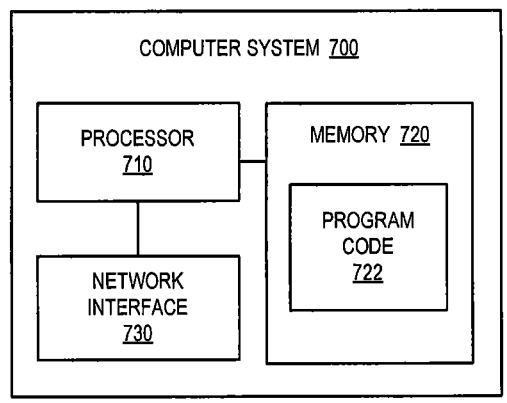
FIG. 7 is a block diagram of a computer system that may be incorporated into various components of the computer system of FIG. 1A in accordance with some embodiments.

FIG. 7 is a block diagram of a computer system 700 that may be used as an authorization server/node 125, issuer server/node 120, primary account device 101, secondary account device 105, merchant terminal/node 111, and/or other computer hardware to perform the operations of one of more of the embodiments disclosed herein for one or more of those elements. The computer system 700 can include one or more network interface circuits 730, one or more processor circuits 710 (referred to as "processor" for brevity), and one or more memory circuits 720 (referred to as "memory" for brevity) containing computer-readable program code 722.

The processor 710 may include one or more data processing circuits, such as a general purpose and/or special purpose processor (e.g., microprocessor and/or digital signal processor) that may be collocated or distributed across one or more networks. The processor 710 is configured to execute program code 722 in the memory 720, described below as a computer readable storage medium, to perform some or all of the operations for one or more of the embodiments disclosed herein.

When the computer system 700 is configured as a primary account device 101 or secondary account device 105, the network interface 730 includes one or more radio transceivers configured to communicate with wireless devices (such as merchant terminal 111) using one or more radio access technologies. The radio access technologies may include, but are not limited to, Near Field Communication (NFC), Bluetooth, WLAN (IEEE 802.11), 3GPP Long Term Evolution (LTE), etc.

When configured as a primary account device 101 or secondary account device 105, the computer system 700 described herein may be provisioned with account parameters (including the transaction restriction parameters and account replenishment parameters described herein) to enable the devices to conduct transactions with respect to the primary and/or secondary account. The account parameters (also referred to as "account credentials") are information relating to an account (e.g., a financial account, bank account, payment account, etc.) associated with a user that can be used to conduct transactions on the user's account (e.g., by placing the device in proximity to a contactless reader of an access device such as a point-of-sale (POS) terminal). Account parameters may include a semi-static set of data and a dynamic set of data, and some of the account parameters may be limited-use account parameters. The semi-static set of data may include an identifier that can be used to identify the account associated with the device (e.g., an account identifier such as a primary account number (PAN), an alternate account identifier such as a secondary PAN, or a token that is a substitute for an account identifier, etc.), an expiry date, and/or other account details or data that does not necessarily change for an extended period of time, or in some embodiments, for the lifetime of the account. The dynamic set of data may include one or more keys, information associated with the one or more keys, and/or other dynamic data that has a limited lifespan and is repeatedly refreshed or replenished during the lifetime of an account. The dynamic set of data can be used for or can relate to on-device generation of dynamic transaction cryptograms, or can represent dynamic transaction data during payment transactions. The dynamic set of data may be limited-use in the sense that the dynamic set of data can be used for only a limited time or a limited number of transactions, and may need to be renewed, refreshed, updated, or replenished when the dynamic set of data has exhausted its limited usage. For example, the dynamic set of data may include a limited-use key (LUK) that is used as an encryption key to generate a transaction cryptogram during a transaction.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer server, comprising:
a network interface;
a processor coupled to the network interface; and
a memory coupled to the processor, the memory comprising a computer-readable storage medium storing computer-readable program code therein that, when executed by the processor, causes the processor to perform operations comprising:
receiving, through the network interface via a network node that is outside of a payments network, a restriction request message comprising a restriction parameter for a secondary account from a consumer device used by a user of a primary account that is associated with the primary account;

receiving, from one of the consumer device used by the user of the primary account and a secondary consumer device used by a user of the secondary account through the network interface, a replenishment request message comprising a password and an account replenishment parameter for the secondary account, wherein the replenishment request message is received via a network node that is outside of the payments network;

performing authentication based on the password included in the replenishment request message;

identifying the restriction parameter for the secondary account responsive to the authentication;

generating a replacement key that is associated with the account replenishment parameter for the secondary account, responsive to determining that the account replenishment parameter satisfies the restriction parameter;

transmitting, through the network interface via a network node that is outside of the payments network, a replenishment response message comprising the replacement key to a device used by the user of the secondary account that is associated with the secondary account;

receiving, through the network interface via the payments network, a transaction authorization request message that identifies the secondary account and includes a merchant-defined transaction parameter; and responsive to determining that the merchant-defined transaction parameter exceeds an account replenishment parameter for the secondary account, preventing transmission of an authorization response message through the network interface for an electronic transaction with a merchant terminal that is coupled to one of a plurality of payment nodes based on the merchant-defined transaction parameter relative to the account replenishment parameter for the secondary account.

2. The computer server of claim 1, wherein the payments network comprises the plurality of payment nodes, wherein the restriction parameter comprises a transaction restriction parameter for the secondary account, wherein the replacement key is to replace a pre-existing key that is stored in the device associated with the secondary account, and wherein the generating the replacement key is performed independent of exhaustion of any parameters associated with the pre-existing key.

3. The computer server of claim 2, wherein the computer-readable program code, when executed by the processor, causes the processor to perform operations further comprising:

updating, in a database that is accessible to the server, a data structure for the secondary account responsive to the generating the replacement key, wherein the data structure logically associates the replacement key and the account replenishment parameter with the secondary account responsive to the updating thereof.

4. The computer server of claim 3, wherein, after transmitting the replenishment response message, the computer-readable program code, when executed by the processor, causes the processor to perform operations further comprising:

responsive to determining that the merchant-defined transaction parameter does not exceed the account replenishment parameter for the secondary account, transmitting, through the network interface via the payments network, the authorization response message for the electronic transaction.

5. The computer server of claim 4, wherein the server comprises an authorization server that transmits the authorization response message to an issuer of the primary account that is communicatively coupled to one of the payment nodes, and wherein preventing transmission of the authorization response message through the network interface comprises preventing transmission of the authorization response message to the issuer of the primary account through the network interface.

6. A method comprising:

performing operations as follows by a processor of a server that is communicatively coupled to one of a plurality of payment nodes of a payments network:

receiving, via a network node that is outside of the payments network, a restriction request message comprising a transaction restriction parameter for a secondary account from a consumer device used by a user of a primary account that is associated with the primary account;

receiving, from one of the consumer device used by the user of the primary account and a secondary consumer device used by a user of the secondary account, a replenishment request message comprising a password and an account replenishment parameter for the secondary account, wherein the replenishment request message is received via a network node that is outside of the payments network;

performing authentication based on the password included in the replenishment request message;

identifying the transaction restriction parameter for the secondary account responsive to the authentication;

generating a replacement key that is associated with the account replenishment parameter for the secondary account, responsive to determining that the account replenishment parameter satisfies the transaction restriction parameter;

transmitting, via a network node that is outside of the payments network, a replenishment response message comprising the replacement key to a consumer device used by the user of the secondary account that is associated with the secondary account;

receiving, through a network interface via the payments network, a transaction authorization request message that identifies the secondary account and includes a merchant-defined transaction parameter; and responsive to determining that the merchant-defined transaction parameter exceeds an account replenishment parameter for the secondary account, preventing transmission of an authorization response message through the network interface for an electronic transaction with a merchant terminal that is coupled to one of the payment nodes based on the merchant-defined transaction parameter relative to the account replenishment parameter for the secondary account.

7. The method of claim 6, wherein the replacement key is to replace a pre-existing key that is stored in the consumer device associated with the secondary account, and wherein the generating the replacement key is performed independent of exhaustion of any parameters associated with the pre-existing key.

8. The method of claim 7, further comprising:

updating, in a database that is accessible to the server, a data structure for the secondary account responsive to the generating the replacement key, wherein the data structure logically associates the replacement key and the account replenishment parameter with the secondary account responsive to the updating thereof.

9. The method of claim 8, further comprising the following after transmitting the replenishment response message:
responsive to determining that the merchant-defined transaction parameter does not exceed the account replenishment parameter for the secondary account, transmitting, from the server via the payments network, the authorization response message for the electronic transaction with the merchant terminal.

10. The method of claim 9, wherein the transaction authorization request message comprises a transaction cryptogram provided by the merchant terminal, wherein the transaction cryptogram is signed by the replacement key, and further comprising the following responsive to receiving the transaction authorization request message:
accessing, by the server, the data structure for the secondary account that logically associates the replacement key therewith based on an identifier of the secondary account;
generating, by the server, a verification cryptogram using the replacement key; and
comparing the verification cryptogram to the transaction cryptogram provided by the merchant terminal,
wherein the authorization response message is transmitted responsive to a match indicated by the comparing.

11. The method of claim 6, wherein the server comprises an authorization server that transmits the authorization response message to an issuer of the primary account that is communicatively coupled to one of the payment nodes, and wherein preventing transmission of the authorization response message through the network interface comprises preventing transmission of the authorization response message to the issuer of the primary account.

12. The method of claim 9, further comprising the following prior to transmitting the authorization response message:
identifying, by the server, the secondary account as being associated with the primary account based on an identifier included in the transaction authorization request message,
wherein the account replenishment parameter for the secondary account limits the electronic transaction between the primary account and the merchant terminal.

13. The method of claim 12, wherein the identifying comprises:
identifying, by the server, the identifier of the secondary account included in the transaction authorization request message as a token that was previously generated by the server, wherein the token associates the secondary account as a sub-account of the primary account.

14. The method of claim 13, further comprising the following prior to receiving the restriction request message:
generating, by the server, the token as the identifier of the secondary account;
creating a token data structure that logically associates the token with the secondary account as the sub-account of the primary account;
storing the token data structure in a database that is accessible to the server; and
transmitting, via a network node that is outside of the payments network, a message comprising the token to the device associated with the secondary account,
wherein the identifying comprises accessing the token data structure in the database responsive to receiving the transaction authorization request message to identify the identifier of the secondary account as the token.

15. The method of claim 13, wherein the token comprises a resource locator identifying the server, wherein the server comprises an authorization server that transmits the authorization response message to an issuer of the primary account that is communicatively coupled to one of the payment nodes, and wherein transmitting the authorization response message comprises:
generating, at the authorization server, the authorization response message by replacing the token included in the transaction authorization request message with an identifier of the primary account that was generated by the issuer; and
transmitting, from the authorization server, the authorization response message for the transaction between the merchant terminal and the primary account to the issuer of the primary account.

16. The method of claim 6, wherein:
the transaction restriction parameter comprises one of a plurality of transaction restriction parameters for the secondary account received in the restriction request message from the consumer device associated with the primary account via the network node that is outside of the payments network;
the authorization response message indicates authorization for the transaction between the merchant terminal and the primary account subject to the transaction restriction parameters as updated based on the account replenishment parameter for the secondary account; and
the secondary account comprises one of a plurality of secondary accounts associated with the primary account, each of which is associated with respective transaction restriction parameters by a respective data structure stored in a database.

17. A computer program product, comprising:
a non-transitory computer-readable storage medium storing computer-readable program code therein that, when executed by a processor of a server that is communicatively coupled to one of a plurality of payment nodes of a payments network, causes the processor to perform operations comprising:
receiving, via a network node that is outside of the payments network, a restriction request message comprising a transaction restriction parameter for a secondary account from a consumer device used by a user of a primary account that is associated with the primary account;
receiving, from one of the consumer device used by the primary account user and a secondary consumer device used by a user of the secondary account, a replenishment request message comprising a password and an account replenishment parameter for the secondary account wherein the replenishment request message is received via a network node that is outside of the payments network;
performing authentication based on the password included in the replenishment request message;
identifying the transaction restriction parameter for the secondary account responsive to the authentication;
generating a replacement key that is associated with the account replenishment parameter for the secondary account, responsive to determining that the account replenishment parameter satisfies the transaction restriction parameter;

transmitting, via a network node that is outside of the payments network, a replenishment response message comprising the replacement key to a consumer device used by the user of the secondary account that is associated with the secondary account;

receiving, through a network interface via the payments network, a transaction authorization request message that identifies the secondary account and includes a merchant-defined transaction parameter; and responsive to determining that the merchant-defined transaction parameter exceeds an account replenishment parameter for the secondary account, preventing transmission of an authorization response message through the network interface via the payments network for an electronic transaction with a merchant terminal that is coupled to one of the payment nodes based on the merchant-defined transaction parameter relative to the account replenishment parameter for the secondary account.

18. The computer program product of claim 17, wherein the replacement key is to replace a pre-existing key that is stored in the consumer device associated with the secondary account, and wherein the generating the replacement key is performed independent of exhaustion of any parameters associated with the pre-existing key.

19. The computer program product of claim 18, wherein, after transmitting the replenishment response message, the computer-readable program code, when executed by the processor, causes the processor to perform operations further comprising:

responsive to determining that the merchant-defined transaction parameter does not exceed the account replenishment parameter for the secondary account, transmitting, via the payments network, the authorization response message for the electronic transaction with the merchant terminal.

20. The computer program product of claim 17, wherein the server comprises an authorization server that transmits the authorization response message to an issuer of the primary account that is communicatively coupled to one of the payment nodes, and wherein the computer-readable program code, wherein preventing transmission of the authorization response message through the network interface comprises preventing transmission of the authorization response message to the issuer of the primary account.

21. The computer server of claim 1, wherein the computer-readable program code causes the processor to perform further operations comprising determining whether the merchant-defined transaction parameter exceeds the account replenishment parameter for the secondary account.

22. The computer server of claim 21, wherein determining whether the merchant-defined transaction parameter exceeds the account replenishment parameter for the secondary account comprises determining whether the merchant-defined transaction parameter exceeds a specified account replenishment parameter for the secondary account specific to a merchant associated with the merchant terminal.

23. The computer server of claim 21, wherein determining whether the merchant-defined transaction parameter exceeds the account replenishment parameter for the secondary account is based one at least one of a mode of payment and a number of transactions.

* * * * *